US009645232B2

(12) United States Patent
Saito

(10) Patent No.: US 9,645,232 B2
(45) Date of Patent: *May 9, 2017

(54) ADAPTIVE SENSING SYSTEM

(71) Applicant: SONY CORPORATION, Tokyo (JP)

(72) Inventor: Shin Saito, Stuttgart (DE)

(73) Assignee: SONY CORPORATION, Tokyo (JP)

( * ) Notice: Subject to any disclaimer, the term of this patent is extended or adjusted under 35 U.S.C. 154(b) by 83 days.

This patent is subject to a terminal disclaimer.

(21) Appl. No.: 14/213,346

(22) Filed: Mar. 14, 2014

(65) Prior Publication Data

US 2014/0197979 A1    Jul. 17, 2014

Related U.S. Application Data

(63) Continuation of application No. 12/621,658, filed on Nov. 19, 2009, now Pat. No. 8,723,717.

(30) Foreign Application Priority Data

Dec. 23, 2008  (EP) .................................... 08172747

(51) Int. Cl.
G01S 13/04 (2006.01)
G01S 7/41 (2006.01)
(Continued)

(52) U.S. Cl.
CPC ............... G01S 13/04 (2013.01); G01S 7/41 (2013.01); G01S 13/867 (2013.01); G01S 13/887 (2013.01); G01S 13/89 (2013.01)

(58) Field of Classification Search
CPC ................... G01S 7/41; G01S 13/04
(Continued)

(56) References Cited

U.S. PATENT DOCUMENTS 6,018,646 A * 1/2000 Myllymaki .......... H04B 17/309
455/115.4
6,859,164 B2   2/2005 Kurita et al.
(Continued)

FOREIGN PATENT DOCUMENTS

CN    1716327 A    1/2006

OTHER PUBLICATIONS

N.C. Currie et al., "Infrared and Millimeter-Wave Sensors for Military Special Operations and Law Enforcement Applications", International Journal of Infrared and Millimeter Waves, vol. 17, No. 7, Jul. 1, 1996, XP 000596550, pp. 1117-1138.
(Continued)

Primary Examiner — John B Sotomayor
Assistant Examiner — Marcus Windrich
(74) Attorney, Agent, or Firm — Oblon, McClelland, Maier & Neustadt, L.L.P.

(57) ABSTRACT

An adaptive sensing system can comprise an optical or infrared camera to generate image information relating to a region of observation, a passive sensor to receive electromagnetic radiation, an active sensor to emit and receive electromagnetic radiation, an image processing unit configured to detect the presence of human beings and objects other than human beings in the region of observation based on the generated image information and a control unit. When presence of a human being is detected, the control unit controls the passive sensor so as to receive electromagnetic radiation from at least the region where the human being is detected, and when presence of an object other than a human being is detected, the control unit controls the active sensor so as to transmit and receive electromagnetic radiation to and from at least the region where the object is detected.

23 Claims, 3 Drawing Sheets

(51) Int. Cl.
*G01S 13/88* (2006.01)
*G01S 13/89* (2006.01)
*G01S 13/86* (2006.01)

(58) Field of Classification Search
USPC .......................................................... 342/22
See application file for complete search history.

(56) References Cited

U.S. PATENT DOCUMENTS

| | | | |
|---|---|---|---|
| 6,967,612 B1 | 11/2005 | Gorman et al. | |
| 7,199,358 B2 | 4/2007 | Kim et al. | |
| 7,304,603 B2 | 12/2007 | Reed et al. | |
| 7,385,549 B2 | 6/2008 | Lovberg et al. | |
| 7,804,442 B2 * | 9/2010 | Ammar | G01S 13/887 342/179 |
| 8,098,185 B2 | 1/2012 | Ridgway et al. | |
| 2004/0090359 A1 | 5/2004 | McMakin et al. | |
| 2004/0174289 A1 * | 9/2004 | Singh | G01S 13/04 342/22 |
| 2004/0263379 A1 | 12/2004 | Keller | |
| 2005/0099331 A1 * | 5/2005 | Steinway | G01S 7/411 342/22 |
| 2005/0230604 A1 | 10/2005 | Rowe et al. | |
| 2005/0231416 A1 * | 10/2005 | Rowe | G01S 13/89 342/22 |
| 2005/0231421 A1 * | 10/2005 | Fleisher | G01S 7/411 342/179 |
| 2005/0232459 A1 | 10/2005 | Rowe et al. | |
| 2006/0006995 A1 | 1/2006 | Tabankin et al. | |
| 2006/0139236 A1 * | 6/2006 | Minatogawa | G02B 13/001 345/32 |
| 2007/0057837 A1 | 3/2007 | Huizing et al. | |
| 2007/0286460 A1 * | 12/2007 | Tu | G06K 9/00771 382/103 |
| 2008/0042824 A1 | 2/2008 | Kates | |
| 2009/0284405 A1 * | 11/2009 | Salmon | G01K 11/006 342/22 |
| 2010/0317302 A1 * | 12/2010 | Greenwood | H01Q 1/2258 455/127.1 |
| 2011/0102233 A1 * | 5/2011 | Johnson | G01S 13/003 342/22 |
| 2011/0273320 A1 | 11/2011 | Nogueira-Nine | |
| 2012/0105267 A1 | 5/2012 | DeLia et al. | |

OTHER PUBLICATIONS

Rory Doyle et al., "Stand-off detection of hidden threat objects on personnel at checkpoints and in public areas using active millimetre-wave imaging", SPIE, vol. 5619, Oct. 27, 2004, XP 040193460, 8 pages.

David A. Andrews et al., "Detection of concealed explosives at stand-off distances using wide band swept millimetre waves", SPIE Digital Library, vol. 7117, Sep. 18, 2008, XP 040443743, 9 pages.

"Why Choose GEN 2?", http://www.brijot.com, 10 pages.

Lombardo, N.; Knudson, C.; Ozanich, R.; Rutz, F.; Singh, S.; Tardiff, M.; Kemp, M.; Tierney, M.F.; , "A next-generation countermeasure architecture to prevent explosives attacks at large public events," Technologies for Homeland Security, 2009. HST '09. IEEE Conference on , vol., No., pp. 256-262, May 11-12, 2009.

Chuan-Yu Cho; Wei-Hao Tung; Jia-Shung Wang; "A crowd-filter for detection of abandoned objects in crowded area," Sensing Technology, 2008. ICST 2008. 3rd International Conference on , vol., No., pp. 581, 584, Nov. 30, 2008-Dec. 3, 2008.

Chuan-Yu Cho; Wei-Hao Tung; Jia-Shung Wang, "A crowd-filter for detection of abandoned objects in crowded area," Sensing Technology, 2008. ICST 2008. 3rd International Conference on , vol., No., pp. 581, 584. Dec. 2008.

* cited by examiner

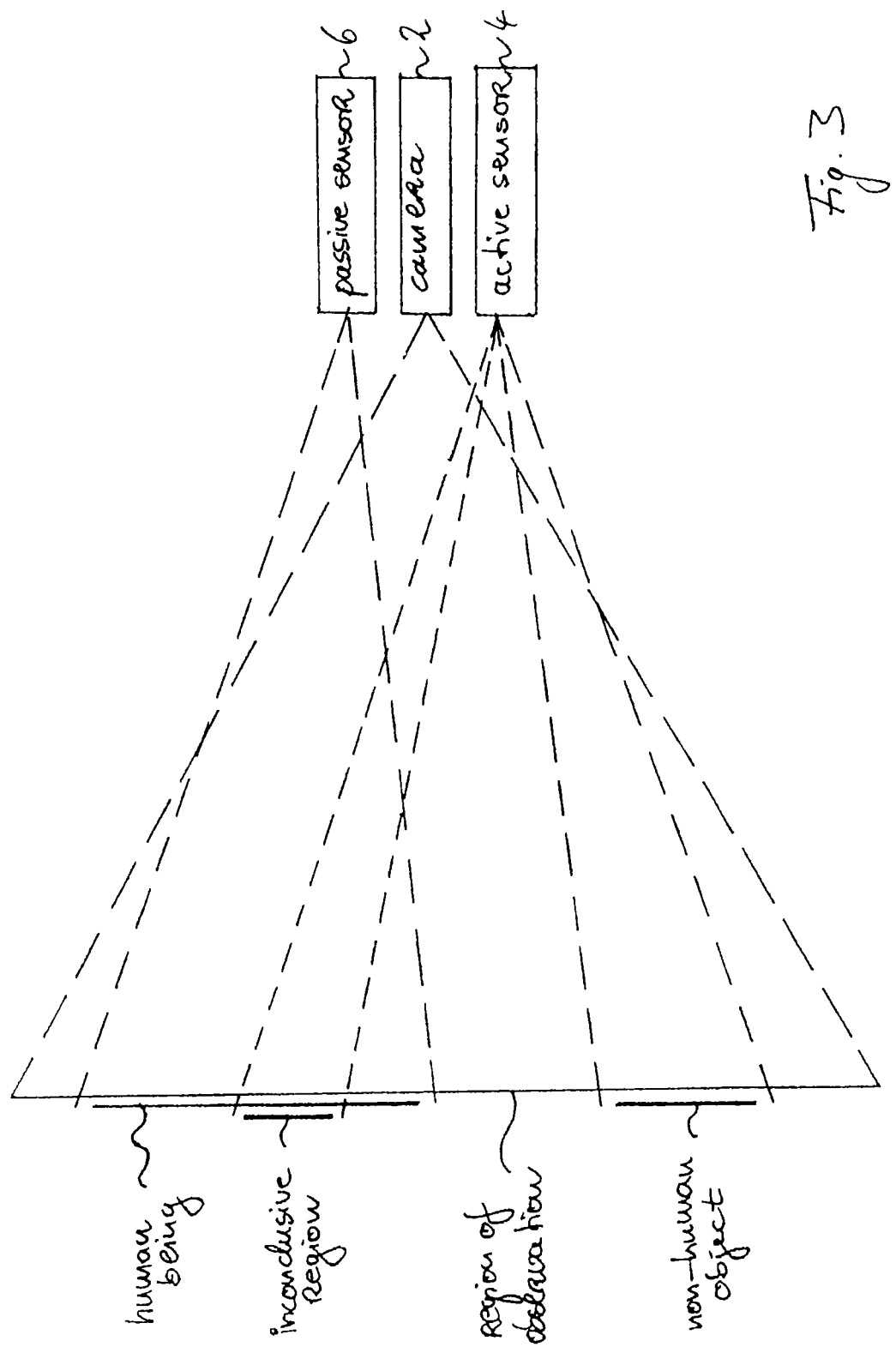

ADAPTIVE SENSING SYSTEM

CROSS-REFERENCE TO RELATED APPLICATIONS

This application is a continuation application of U.S. application Ser. No. 12/621,658, filed Nov. 19, 2009, which claims foreign priority to European Application No. 08172747.1, filed Dec. 23, 2008. The entire contents of each of the foregoing documents are incorporated herein by reference.

FIELD OF THE INVENTION

The present invention relates to the fields of electromagnetic sensing, automatic security screening and contraband detection. The present invention especially relates to an adaptive sensing system, a sensing method and a corresponding computer program product.

DESCRIPTION OF THE PRIOR ART

Sensing systems based on electromagnetic radiation or electromagnetic fields are known to be applied in a wide range of applications. An example being a scanning for potentially dangerous objects like knives, weapons, bombs and so on that is performed in or in relation with public or private places like e.g. airports, mass gatherings and high security zones/buildings for private, public or military purpose. Another example is a scanning for goods of which the import or export is forbidden or for which an import or export tax has to be paid which is performed at a border station or at places like e.g. international airports. Still another example, is a scanning for medical purpose. The scanning performed may or may not be image taking. Depending on the type of radiation or field used, the sensing system can "see through" material that is otherwise intransparent to the visible spectrum of electromagnetic radiation. Thus, objects or specific materials, matter or tissues under clothes, within a bag or within a human body can be detected and eventually visualized.

Examples of radiation employed include infrared radiation, alternating magnetic fields and X-ray radiation. Recently, radiation in the Terahertz frequency range has become accessible for scanning purposes due to advancements in antenna technology and semiconductor technology. In the following the term millimeter wave (mm-wave) radiation is used for example to refer to radiation with a wavelength in the range of 0.1 mm to 10 mm, but may cover also different ranges which e.g. extend up to 100 mm. mm-wave radiation is emitted by every object as part of the black body radiation (Planck spectrum). A metal knife that is carried on the body under the clothing, may be detected due to its blockage or absorption of the mm-wave radiation emitted by the body. mm-wave radiation is strongly absorbed by water and the power emitted by a human body in the mm-wave region is quite low. Therefore, it is practically impossible to see through a wet coat for example.

A differentiation is made between an active sensor based scanning and a passive sensor based scanning. In an active sensor system, the active sensor generates radiation or an electromagnetic field which interacts (e.g. by means of reflection, absorption, modulation and phase change) with an object to be scanned and then is sensed (received) again by the sensor. The sensed (received) radiation or field depends on the specific interaction of the object to be scanned with the generated radiation or field, so that information about the object (for example an image) is obtained. Examples of active sensors are radiographic cameras employing an X-ray source, metal detectors generating a varying magnetic field and detecting modulations of the magnetic field and radar type sensors (e.g. in the mm-wave or microwave wavelength region). Passive sensors do not generate radiation or an electromagnetic field and detect the field or radiation generated by or emitted from an object to be scanned. An example of a passive sensor is a mm-wave sensor detecting the mm-wave radiation that is part of the blackbody radiation emitted by the object.

Active sensors have the problem that an electromagnetic field or radiation may cause harm to objects and, especially, to living beings which are exposed to the field or radiation. At least for some frequency ranges, regulations exist which limit the amount and strength of field or radiation that a sensor may generate and/or to which a person may be exposed. In known sensing systems, a person must stand still in a gantry or in front of a sensor. This allows for attaining the regulatory values but is a source of incommodation to the individual.

BRIEF DESCRIPTION OF THE INVENTION

The object of the present invention is to provide a sensing system, a sensing method and a computer program product which provides for low incommodation of individuals and which provides for a low exposition of individuals to electromagnetic radiation.

An adaptive sensing system according to the present invention comprises a passive sensor for receiving electromagnetic radiation, an active sensor for emitting and receiving electromagnetic radiation, a detection unit adapted to detect the presence of human beings and objects other than human beings in a region of observation and a control unit. In case the presence of a human being is detected, the control unit is adapted to control the passive sensor so as to receive electromagnetic radiation from at least the region where the human being is detected and, in case the presence of an object other than a human being is detected, the control unit is adapted to control the active sensor so as to transmit and receive electromagnetic radiation to and from at least the region where the object is detected.

By adapting the sensor that is applied for sensing according to the sensed object, individuals may be allowed to roam freely thereby increasing the convenience for the individuals and facilitating a sensing that is unperceived by the individuals. Further, exposition of individuals to electromagnetic radiation is low as individuals are sensed with a passive sensor.

It is advantageous when, in case the presence of a human being is detected, the active sensor is either prevented from emitting any electromagnetic radiation into at least the region where the human being is detected or is prevented from emitting electromagnetic radiation which exceeds a preset power or field strength threshold into at least the region where the human being is detected. Because too strong or too powerful radiation is prevented, safety regulations in relation to the emission of radiation and the exposition of human beings electromagnetic radiation may be fulfilled.

The adaptive sensing system advantageously further comprises an optical or infrared camera for generating image information, whereby said detection of human beings and objects other than human beings is based on the generated image information.

Using optical or infrared images, reliable and inexpensive detection of human beings and objects other than human can be achieved.

The adaptive sensing system advantageously further comprises a temperature sensor, whereby said detection of human beings and objects other than human beings is based on temperature information generated by the temperature sensor.

Using a temperature sensor a reliable and inexpensive detection of human beings and differentiation between human beings and non-human object can be achieved.

Advantageously, the adaptive sensing system further comprises a passive contraband detection unit for detecting the presence of specific, for example dangerous, unwanted or forbidden, objects based on sensor information that is generated by the passive sensor based on the electromagnetic radiation received from at least the region where the human being is detected. Thus, contraband objects are automatically detected.

Advantageously, the passive contraband detection unit is adapted to generate a first detection result indicating that the presence of a specific object is precluded, a second detection result indicating that the presence of a specific object is detected and a third detection result indicating that the presence of a specific object can neither be precluded nor detected, whereby, in case the passive contraband detection unit generates the third detection result, the control unit is adapted to control the active sensor so as to emit and receive electromagnetic radiation to and from at least the region for which the presence of a specific object can neither be precluded nor detected. Thus, the sensing capability of the sensing system is increased and more contraband objects can be detected which increases security and reduces the amount of human labor required to detect contraband objects.

Advantageously, said emission of electromagnetic radiation that is performed in case the third detection result is generated is substantially restricted to said region where the presence of a specific object can neither be precluded nor detected. Thus, the exposition of human objects to electromagnetic radiation is further reduced.

Advantageously, the image processing unit is adapted to determine the region where a human being or an object other than a human being is detected, the passive contraband detection unit is adapted to determine the region for which the presence of a specific object can neither be precluded nor detected, the passive sensor is adapted to be steered to different regions so as to receive electromagnetic radiation from a region towards which the sensor is steered and the active sensor is adapted to be steered to different regions so as to transmit and receive electromagnetic radiation to and from the region towards which the sensor is steered.

The adaptive sensing system may comprise a detection unit adapted to detect the presence of specific objects based on sensor information generated by the passive sensor and/or the active sensor and to raise an acoustic, optic or otherwise alarm in case a predefined object is detected.

The adaptive sensing system may comprise a display unit, whereby the active sensor and/or the passive sensor is adapted to generate image information and the display unit is adapted to display image information generated by the active sensor and/or the passive sensor.

Advantageously, the passive sensor is adapted to operate in the millimeter wave range of electromagnetic radiation.

A method of sensing according to the present invention comprises steps of detecting the presence of human beings and objects other than human beings in a region of observation and, in case a human being is detected, causing a passive sensor to receive electromagnetic radiation from at least a region where the human being is located and, in case an object other than a human being is detected, causing an active sensor to transmit and receive electromagnetic radiation to and from at least a region where the object is located.

Advantageously, the method of sensing further comprises a step of generating image information relating to a region of observation using an optical or infrared camera, whereby the step of detecting the presence of human beings and objects other than human beings is based on the generated image information.

Advantageously, the method further comprises a step of detecting specific, for example dangerous, unwanted or forbidden, objects based on sensor information that is generated by the passive sensor based on the electromagnetic radiation received from at least the region where the human being is located.

In case the presence of a specific object can neither be precluded nor detected, the method advantageously comprises a further step of causing the active sensor to emit and receive electromagnetic radiation to and from at least a region for which the presence of a specific object can neither be precluded nor detected.

It is advantageous when the step of detecting the presence of human beings and objects other than human beings comprises determining the region where a human being or an object other than a human being is located, the step of causing the passive sensor to receive electromagnetic radiation from at least a region where the human being is located comprises steering the passive sensor to the determined region where the human being is located so as to receive electromagnetic radiation from the determined region and the step of causing the active sensor to transmit and receive electromagnetic radiation to and from at least a region where the object is located comprises steering the active sensor to the determined region where the object other than human being is located so as to transmit and receive electromagnetic radiation from the region. It is further advantageous when the step of detecting specific objects comprises determining the region for which the presence of a specific object can neither be precluded nor detected and the step of causing the active sensor to emit and receive electromagnetic radiation to and from at least the region for which the presence of a specific object can neither be precluded nor detected comprises steering the active sensor to the determined region for which the presence of a specific object can neither be precluded nor detected so as to emit and receive electromagnetic radiation to and from the region.

A computer program product according to the present invention is adapted to carry out the method according to the present invention when it is executed by a processing device.

BRIEF DESCRIPTION OF THE DRAWINGS

FIG. 3 illustrates the various instances of emission and reception of electromagnetic radiation according the embodiment of the present invention.

DESCRIPTION OF THE PREFERRED EMBODIMENTS

Figure 1:
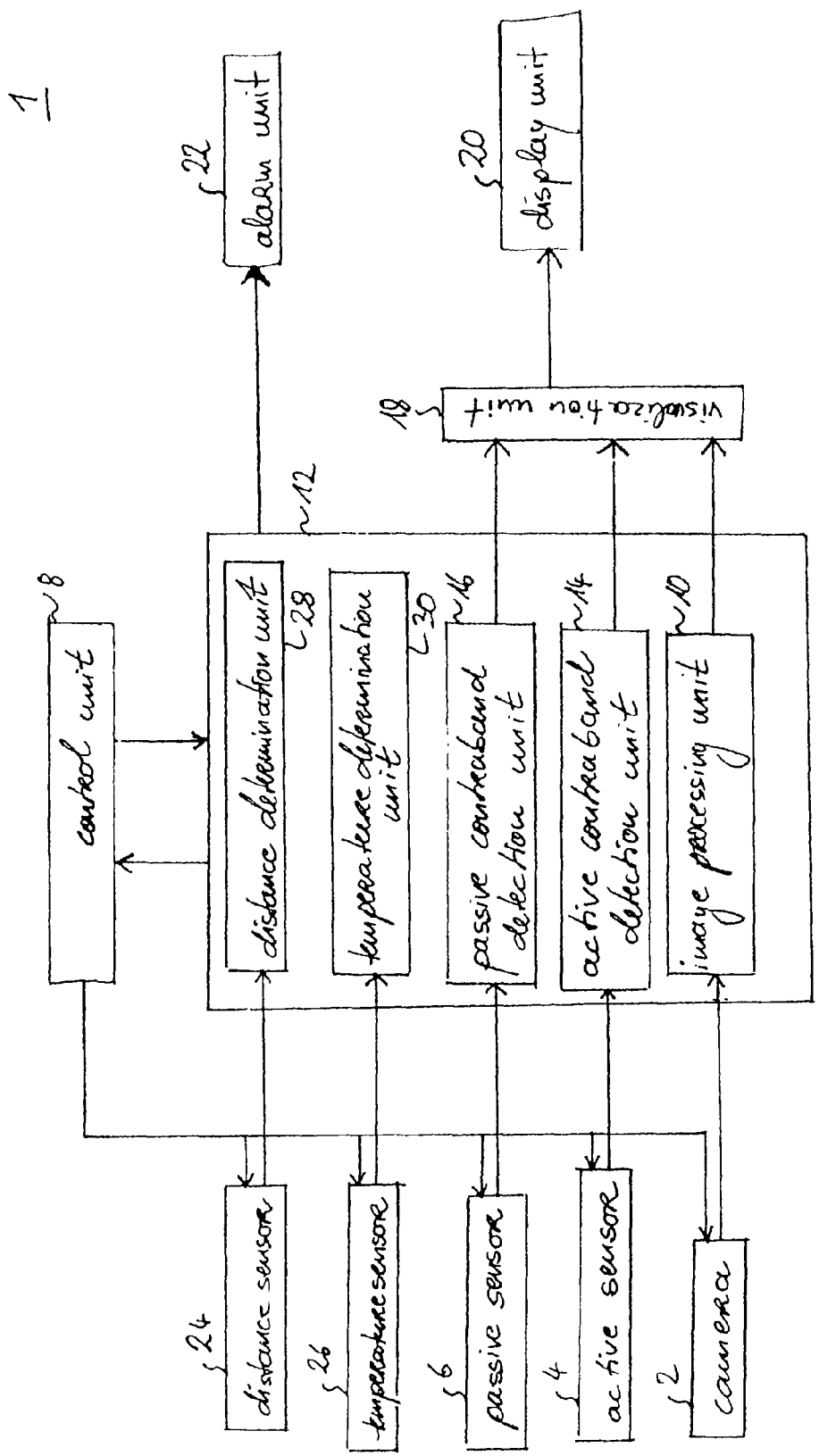
FIG. 1 shows a block diagram of an embodiment of the adaptive sensing system according to the present invention.

FIG. 1 shows an embodiment of the adaptive sensing system 1 according to the present invention. The system 1 may, for example, be employed as a sensing device that detects weapons, bombs and other contraband goods. The system 1 may, for example, be installed in a corridor of an airport for unperceivedly screening passing passengers and/or airport/airline personnel.

The adaptive sensing system 1 comprises a camera 2, an active sensor 3 and a passive sensor 4. The camera 2 may be an optical or an infrared (IR) camera.

The camera 2 is able to take two-dimensional (2D) or three-dimensional (3D) images from a region of observation. More than one camera 2 may be provided.

The passive sensor 6 may comprise a plurality of physical sensing units located at different locations, for example, in order to concurrently obtain an image or sensor data relating to one side (e.g. frontside or left) of an individual and the other side (e.g. backside or right) of the individual. Generally, passive sensor 6 may be any sensor operating on another wavelength range than the camera 2, i.e. any sensor other than optical or IR. The passive sensor 6 may, for example, be a microwave sensor. In the following description, the passive sensor 6 is sometimes assumed to be a mm-wave sensor operable to receive mm-wave electromagnetic radiation and to produce detection results according to the received mm-wave radiation. In the present document, the term millimeter wave (mm-wave) radiation is used to refer to radiation with a wavelength in the range of 0.1 mm to 10 mm. More than one passive sensor 6 may be provided.

The active sensor 4 may, generally, be any sensor operating on another wavelength range than the camera 2, i.e. any sensor other than optical or IR. When the active sensor 4 operates in the same wavelength range as the passive sensor 6, a radiation or field reception part may be shared with the passive sensor 6. When the active sensor 4 operates in another wavelength range than the passive sensor 6, the range of materials which is intransparent to both the radiation used by the passive sensor 6 and the active sensor 4 is reduced so that it becomes more difficult to hide objects from the sensing system 1. The active sensor 4 may, for example, be a reflection or transmission type radiographic imaging device or a magnetic field based non imaging metal detector. Other examples are active microwave or mm-wave sensors. The active sensor 4 may comprise a plurality of physical sensing units located at different locations, for example, in order to concurrently obtain an image or sensor data relating to one side (e.g. front side or left) of an individual and the other side (e.g. backside or right) of the individual. A plurality of active sensors 4 (of possibly different sensor kinds) may be provided.

Generally, the active sensor 4 and the passive sensor 6 may be static or their detection field may be steerable so as to cover different scanning regions. In the following, it is sometimes assumed that the active sensor 4 and the passive sensor 6 are of the latter kind, that is, it is assumed that the active sensor 4 and the passive sensor 6 are steerable sensors. The sensing system 1 comprises a control unit 8 which controls the operation of the active sensor 4 and the passive sensor 6. The control unit 8 controls the activation state (on/off) and the scanning direction (scanning field) of the sensors 4, 6 and controls the power and/or field strength of the electromagnetic field or radiation emitted by the active sensor 4. The present document uses the notion electromagnetic radiation in a meaning that includes pure electromagnetic fields (i.e. electric and magnetic fields) unless other use (excluding pure electromagnetic fields) is explicitly noted or is inferable from the context and/or or technical skill.

The sensing system 1 comprises a detection unit 12 comprising an image processing unit 10 which is adapted to detect human beings and objects other than human beings based on the image information generated by the camera 2. In the following, the objects other than human beings may also be referred to as non-human objects or simply as objects. By means of the detection of human beings it is possible to use the active sensor 4 to detect e.g. a metallic weapon or other object that is located in a bag which can not be detected by a passive sensor 6 and to use the passive sensor 6 to detect the metallic weapon or other object when it is carried on or close to the human body (e.g. within a jacket or in a pocket) without exposing the person to electromagnetic radiation. Generally, a power or field level of the active sensor 4 may be controlled depending on whether (and where) a human being has been detected or not. For instance, when a human being is detected and human safety regulations prescribe a maximum power of 10 dBm which is different from that of non human's regulation, the power directed towards the human being is controlled to be less than 10 dBm (10 mW). When no human being is detected, the active sensor 4 can emit more power according to normal (non human related) regulations.

Detection of human beings may, for example, be based on face detection algorithms and/or (human) body detection algorithms and may be implemented in hardware and/or software. Especially face detection solutions are available now at an affordable price, since such technique is now commonly found in many consumer products, like e.g. digital still cameras and camcorders. Advantageously, the image processing system 10 is adapted (e.g. after a calibration or learning process) to differentiate between objects temporarily brought into the region of observation and other objects which are permanently in the region of observation (e.g. walls of a building, fixture, fittings and furniture). Only the former will be detected as non-human objects. Advantageously, the image processing unit 10 tracks the (movement of) human beings and objects. Thus, it is prevented that a human being or object is detected and scanned twice. Tracking may also assist in compensating motion of the human being or object during the scanning of the human being or object with the active or passive sensor thereby facilitating to obtain a complete scan of an object or human being (including two or more sided scans, e.g. front side and backside or left and right). A differentiation between temporary and non-permanent objects may be based on the tracking functionality. Further, the image processing unit 10 may be adapted to predict the movement of human beings and objects. Based on the predicted movements the various scanning/sensing activities can be scheduled. For example, a scanning by the active scanner 4 may be stopped or interrupted, when it is predicted that a human being moves into the scanning region. Thereby, exposition of human beings to radiation is reduced.

In the following, the image processing unit 10 is sometimes assumed to be adapted to determine the location of detected human beings and/or objects other than human beings. Generally, the image processing unit 10 is not required to be able to perform such determination. The location may, for example, be given in two or three dimensions and advantageously reflects the extension of the human being or object. The image processing unit 10 may, for example, determine the direction or the space area of a human being or object.

The detection unit 12 further comprises an active contraband detection unit 14 and a passive contraband detection unit 16. The notions "active" and "passive" do not imply any limitation of the operation or structure of the active and passive contraband detection units 14, 16. "Active" and "passive" simply indicates a relation to the active sensor 4 and the passive sensor 6, respectively. The active contraband detection unit 14 and the passive contraband detection unit 16 are adapted to detect specific objects based on the sensor information generated by the active sensor 4 and the passive sensor 6, respectively. For example, weapons, knives, bottles, electronic circuitry, specific materials like e.g. metals may be "specific objects" which are detected. The range of objects that may be detected depends on the area of application of the sensing system and is not limited in any way except for any inherent detection limitations of the sensor 6, 8 and the detection unit 14, 16. The range of objects detectable by the active contraband detection unit 14 and the passive contraband detection unit 16 generally may be the same, but, normally, will differ due to usage of a different section of the electromagnetic spectrum in the active sensor 4 and the passive sensor 6.

Besides detecting specific objects from either the sensor information generated by the active sensor 4 or the sensor information generated by the passive sensor 6, specific objects may also be detected by the detection unit 12 using the information generated by the active sensor 4 and the information generated by the passive sensor 6 in an integral fashion.

Image information from the camera 2 and sensor information from the active sensor 4 and the passive sensor 6 are provided along with derived information (e.g. locations of human beings, locations of objects other than human beings, locations of specific objects, kind of specific objects detected, inconclusive regions) are provided to a visualization unit 18. The information from the active and the passive sensor may but need not correspond to image information. The visualization unit 18 processes the received information and displays it on the display unit 20. Any kind of display is possible for the information. For example, the information corresponding to camera 2, active sensor 4 and passive sensor 6 may be displayed in juxtaposition and/or overlayed. Visualization and display are optional.

Further an optional alarm unit 22 is provided for generating a physical alarm (e.g. acoustical, vibrational, optical alarm). The alarm may indicate which specific object is detected and where it is detected. In case an optical alarm is generated, the alarm unit 22 may be realized by the visualization unit and the display unit. An alarm is generated for example in case a specific object is detected. Also, for example, when metal material and something strange object is detected at the same space, an alarm can be generated. For instance, when the IR or optical image is recognized as reference, the system 1 can detect something different compared with reference data.

Figure 2A:
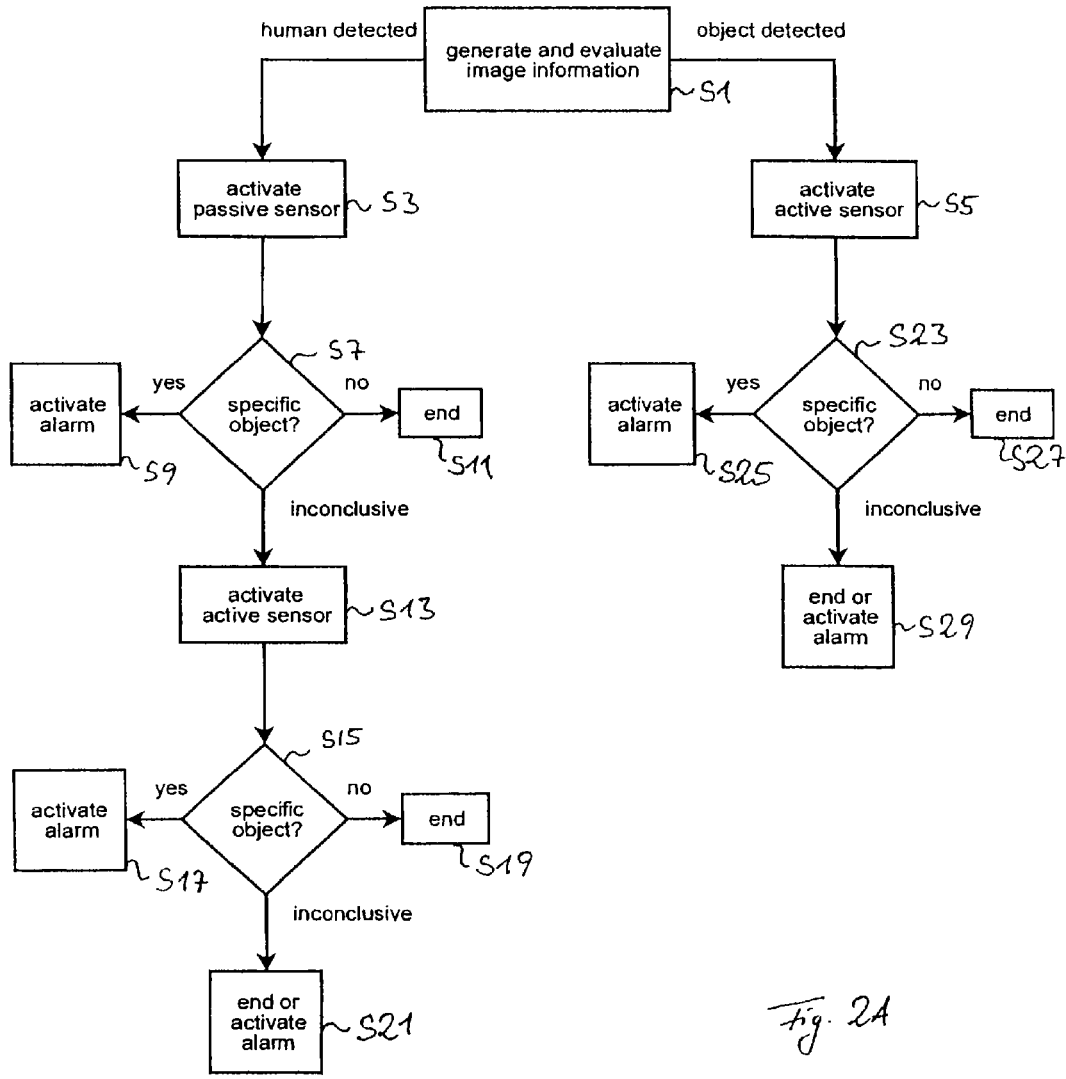
FIG. 2A illustrates an embodiment of the sensing method according to the present invention.

Having described basic operational units of the embodiment of the sensing system 1 according to the present invention, now an embodiment of the sensing method according to the present invention is described in relation with FIG. 2A. The sensing method according to the embodiment is, unless otherwise noted, executed by the sensing system 1.

In a step S1, image information corresponding to the region of observation is generated by the camera 2 and the image information is evaluated by the image processing unit 10. In case a human being is detected, the sensing process proceeds to a step S3. In case an object other than a human being is detected, the sensing process proceeds to a step S5. It must be noted that, even when branching to step S3 or step S5, step S1 is not left and the generation and evaluation of image data does continue. Every time a human being or a non-human object is detected, a contraband detection process starting at step S3 and step S5, respectively, is started.

In step S3, the passive sensor 6 is activated and the detected human being is scanned by the passive sensor 6. Generally it is possible that passive sensor scans the whole region of observation. It is more efficient (in terms of time needed, scanning resolution, energy required) however to scan essentially only the region where the human being is located.

In ensuing step S7 it is determined by the passive contraband detection unit 16 based on the sensor information generated by the passive sensor in step S3, whether a specific object is detected. In case one or more specific objects are detected, the process proceeds to step S9 and activates an alarm indicating the detection of a specific object where after the processing for the detected human being may, but need not, end. In case the presence of a specific object in the scanned region can be excluded, the processing for the detected human being may, but need not, end (step S11). In case the presence of a specific object can neither be precluded nor detected, the method proceeds to step S13 for applying a further scanning. Alternatively to proceeding to step S13, an alarm may be raised indicating that the presence of a specific object could neither be precluded nor detected where after the processing for the currently detected human being may, but need not, end. A human operator may then decide on a further course of action. To summarize: When a specific object is clearly detected, an alarm is raised. When, the generated sensor information comprises no indications for the presence or eventual presence of a specific object, the processing ends. And, finally, when the generated sensor information comprises indications for the presence or eventual presence of a specific object but a specific object is nevertheless not clearly detectable, a further scanning is applied or a further type of alarm is raised.

Of course, the detection of the presence of a specific object does not imply that a specific object is really present and the preclusion of the presence of a specific object does not imply that a specific object is really absent as false positives and false negatives always may occur in real life systems. What indicia will lead to which detection result depends on desired reliability of the detection result, the demanded level of security, the area of application, official or other regulations and on many other factors, whereby any inherent detection limitation of the used technology must be taken into account.

In step S13, the active sensor 4 is activated and scans at least the region for which the presence of a specific object can neither be precluded nor detected. The region for which the presence of a specific object can neither be precluded nor detected is in the following referred to as inconclusive region. The inconclusive region may comprise a plurality of non connected regions. Each of such subregions will be scanned by the active scanner 4. Examples of inconclusive region include any region which prevents from "looking through" or "looking under" (e.g. wet regions or metal applications on clothing in case of a mm-wave passive sensor 4) and "strange objects" which can not be identified. Although the sensor 4 may scan the whole region of observation, it is, especially in view of potential hazards to the health of the human being, advantageous to restrict the scanning region as close as possible to the inconclusive region. By doing so, the exposure of the human being to the electromagnetic radiation is reduced as far as possible. During the scanning, the active sensor 4 is controlled so as to obey all regulations on emission of electromagnetic radiation (e.g. obey threshold values on emitted power, power density, field strength, exposure duration), especially regulations on the exposure of human beings to radiation.

In ensuing step S15, it is determined by the active contraband detection unit 14 based on the sensor information generated by the active sensor 4 in step S13 whether a specific object is detected. In case one or more specific objects are detected, the process proceeds to step S17 and activates an alarm indicating the detection of a specific object where after the processing for the inconclusive region may, but need not, end. In case the presence of a specific object can be excluded, the processing for the inconclusive region may, but need not, end (step S19). In case the presence of a specific object can neither be precluded nor detected, the process proceeds to step S21.

In step S21, the process for the inconclusive region may, but need not, end. Optionally, an alarm is raised in step S21 indicating that the presence of a specific object can neither be precluded nor detected. The alarm may indicate the region or regions for which the presence of a specific object can neither be precluded nor detected in order to assist operation personnel in performing a manual investigation.

In step S5, the active sensor 4 is activated and the detected object other than a human being is scanned by the active sensor 4. Generally, it is possible that the active sensor scans the whole region of observation (e.g. when the sensor is not steerable). In such case, it must either be verified that no human being is in the region of observation or that the above mentioned safety regulations in relation to the exposure of human beings to electromagnetic radiation are obeyed. It is more efficient (in terms of time needed, scanning resolution, energy required) however to scan essentially only the region where the object is located. More importantly, the exposure of human beings to electromagnetic radiation is further reduced in this case. A further advantage is that an object can be scanned even in case of the presence of a human being so that more entities can be scanned in the same time. By this, the following scenario is avoided: A non-human object can not be scanned at a first instant of time due to the presence of a human being. At a second instant of time at which no human is present, it can not be scanned because the object moved out of the scanning range of the active scanner 4. Thus, the object is not scanned at all and represents a potential security threat.

In ensuing step S23 it is determined by the active contraband detection unit 14 based on the sensor information generated by the active sensor in step S5, whether a specific object is detected. In case one or more specific objects are detected, the process proceeds to step S25 and activates an alarm indicating the detection of a specific object where after the processing for the detected object may, but need not, end. In case the presence of a specific object can be excluded, the processing for the detected object may, but need not, end (step S27). In case the presence of a specific object can neither be precluded nor detected, the process proceeds to step S29.

In step S29, the processing for the detected object may, but need not, end. Optionally, an alarm is raised in step S29 indicating that the presence of a specific object can neither be precluded nor detected. The alarm may indicate the region or regions for which the presence of a specific object can neither be precluded nor detected in order to assist operation personnel in performing a manual investigation.

While in the above described embodiment there is a difference in the scanned region and power emitted in steps S13 and S5, such difference need not necessarily be made and steps S13, S15, S17, S19 and S21 may be performed identical to steps S5, S23, S25, S27 and S29, respectively. That is, steps S13, S15, S17, S19 and S21 may be replaced by steps S5, S23, S25, S27 and S29, respectively. In this case, the detected human being or the inconclusive region replaces the detected non-human object mentioned in the description of steps S5, S23, S25, S27 and S29.

FIG. 3 further illustrates the above processing by means of an example situation. To the right is shown the camera 2, the active sensor 4 and the passive sensor 6. To the left is shown the region of observation of the camera 2, a human being and an object other than a human being detected by the image processing unit 10 and an inconclusive region as detected by the passive contraband detection unit 16. The passive sensor 6 is steered so as to scan in step S3 substantially only the human being. During evaluation of the sensor data generated by the passive sensor 6 the inconclusive region is detected. The active sensor 4 is steered so as to scan in step S13 substantially only the inconclusive region, which overlaps/intersects (is included) in the region where the human being is located. The active sensor 4 is steered so as to scan in step S5 substantially only the (part of the) non-human object which does not overlap/intersect with the human being.

To which amount the actual scanning region can be limited to the human being, the non-human object and the inconclusive region, respectively, depends inter alia on the sensor technology used, the area of application, and the location determination ability of the image processing unit 10 and the passive contraband detection unit 16. In FIG. 3, the setting is abstractly depicted in a one and two dimensional fashion, this is for ease of depiction and explanation only and must not be construed as limiting the present invention.

The active and the passive sensor might operate simultaneously (e.g. in steps S3 and S5) or only one of active sensor 4 and passive sensor 6 is active at a time. A quasi simultaneous operation may be realized by rapidly switching between the operation of the active sensor 4 and the passive sensor 6. Such may, for example, be useful in case the radiation emitted by the active sensor 6 impedes or disturbs the operation of the passive sensor or in case a radiation or field reception unit is shared by the active sensor 4 and the passive sensor 6.

Now, some features of the sensing system 1 and the sensing method will be explained in more detail and some additional features will be explained.

As is shown in FIG. 1, the sensing system 1 may further comprise a distance sensor 24, a temperature sensor 26, a distance detection unit 28 and a temperature detection unit 30.

The distance sensor 24 is steerable to a human being, a non-human object and an inconclusive region so as to measure the distance of these items to the active sensor 4. In case a plurality of physical sensing units (of the active sensor 4) are provided in different locations, eventually a corresponding plurality of distance sensor 24 may be provided. Each distance sensor 24 hereby sensing the distance to the corresponding physical sensing unit. Based on the distance information, the transmit power/field strength of the active sensor 4 is controlled. The power/strength should be high (high enough) to yield good active sensor information but should be as low as possible—or at least so low as to comply with safety regulations—in order to reduce the exposure of human beings to radiation. The distance sensor is very advantageous when humans are allowed to roam freely (in the region of observation). By using the distance sensor 24, all regulatory values in relation to exposure of human beings to electromagnetic radiation and fields and general regulations in the field of emission of electromagnetic radiation and fields may be obeyed without compromising the quality of the sensing information generated by the active sensor 4.

The distance sensor 24 may for example be implemented as an optical (e.g. laser beam based) distance sensor which is pointable to the region of interest. There must not necessarily be provided a separate distance sensor 24 though. The camera 2 or the active sensor 4 might operate as a distance sensor 24. For example, an autofocus system of the camera might provide distance information. Also the image processing unit 10 might provide distance information (e.g. when the image processing unit 10 provides a 3D location of an detected object or human being, the distance information might be derived from the 3D location information). Also it might be possible to determine the distance based on the electromagnetic radiation received by the active sensor 4. The distance might for example be determined based on the phase (phase information) of the radiation emitted by the active sensor and reflected by the object, human being, or specific object.

Any kind of temperature sensor 26 operable to determine the temperature of a detected object or human being might be employed. The temperature sensor 26 advantageously is a remote sensor (e.g. radiation based) requiring no contact with an entity that is to be measured. The passive sensor 6, for example when implemented as a mm-wave sensor, might operate as a temperature sensor 26.

Figure 2B:
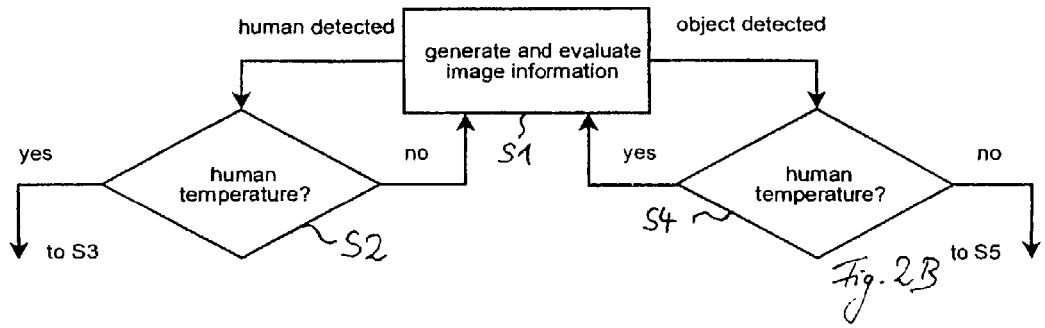
FIG. 2B illustrates a supplemental processing for the embodiment of the sensing method according to the present invention.

The usage of a temperature sensor 26 assists in detection of and discrimination between a non-human object and a human being as is shown in FIG. 2B.

Step S1 of FIG. 2B is the same as Step S1 of FIG. 2A. In step S1, image information corresponding to a region of observation is generated by the camera 2 and the image information is evaluated by the image processing unit 10. In case a human being is detected, the method proceeds to a step S2. In case an object other than a human being is detected, the sensing method to a step S4. It must be noted that, even when branching to step S2 or step S4, step S1 is not left and the generation and evaluation of image data does continue. Every time a human being or a non-human object is detected by the image processing means 10, a process starting at step S2 and step S4, respectively, is started.

In step S2, the temperature of the detected human being is determined and it is determined by the temperature detection unit 30 if the determined temperature corresponds to the temperature of a human being. For example, the temperature determined may correspond to the temperature of a human being when it is above a first threshold (e.g. below 37 degree Celsius) and below a second threshold (e.g. above 37 degree Celsius). If yes, the process proceeds to step S3 of FIG. 2A. If no, the process returns to step S1 of FIG. 2B. Thus, the reliability of the detection of human beings is improved.

In step S4, the temperature of the detected non-human object is determined and it is determined by the temperature detection unit 30 if the determined temperature corresponds to the temperature of a human being. If yes, the process returns to step S1 of FIG. 2B. If no, the process proceeds to step S5 of FIG. 2A. Thus, the reliability of the detection non-human objects is improved. Therefore, the chance that a human being is inadvertently exposed to radiation generated by the active sensor 4 is reduced.

Alternatively or additionally to performing the image data based detection of human beings and non-human objects, a temperature based detection of human beings and non-human objects or any other kind of detection of human beings and non-human objects (i.e. detection based on other sensor data than temperature and optical or IR image) might be performed in step S1 of FIG. 2A. Hereby, the detection advantageously is based on sensor information that is generated by a remote sensor (e.g. radiation based sensor) that requires no contact with an entity that is sensed.

Also, the image information generated by the camera 2 might be used for more purposes than the detection of human beings and non human objects and the steering/control of the active sensor 4 and the passive sensor 6. The detection of contraband objects itself might be based on the image information generated by the camera 2. For example, the image information generated by the camera 2 might serve as a reference data. The detection unit 12 then compares the reference data with the sensor data generated by the active sensor 4, the passive sensors 6 and/or eventual one or more other sensors. When a discrepancy, incompatibility, inconsistency or other irregularity between the data is found, an alarm may be raised or a further scanning (e.g. with a previously unused sensor) is performed.

The invention claimed is:

1. An adaptive sensing system comprising:
    a passive sensor to receive electromagnetic radiation,
    an active sensor to emit and receive electromagnetic radiation,
    detection circuitry configured to detect presence of human beings and objects other than human beings in a region of observation, and
    control circuitry configured to selectively control the passive sensor and the active sensor, the selective control including:
    controlling the passive sensor so as to receive electromagnetic radiation from at least a first portion of the observation region where a human being is detected, responsive to the detection circuitry detecting the presence of the human being in the observation region,
    controlling the active sensor so as to transmit and receive electromagnetic radiation to and from the first portion of the observation region, and
    stopping, interrupting, or reducing an amount of one of power and field strength of the electromagnetic radiation emitted from the active sensor to the first portion of the observation region when the detection circuitry detects the presence of the human being in the observation region.

2. The adaptive sensing system according to claim 1, wherein, the control circuitry is configured to control the active sensor, when the presence of the human being is detected in the observation region, such that the active sensor is either prevented from emitting any electromagnetic radiation into at least the first portion of the observation region where the human being is detected, or is prevented from emitting electromagnetic radiation exceeding a preset power or field strength threshold into at least the first portion of the observation region where the human being is detected.

3. The adaptive sensing system according to claim 1, further comprising an optical or infrared camera configured to generate image information,
    wherein the detection of human beings and objects other than human beings is based on the generated image information.

4. The adaptive sensing system according to claim 1, further comprising a temperature sensor,
    wherein the detection of human beings and objects other than human beings is based on temperature information generated by the temperature sensor.

5. The adaptive sensing system according to claim 1, further comprising passive contraband detection circuitry configured to detect presence of specific objects based on sensor information generated by the passive sensor based on the electromagnetic radiation received from at least the first portion of the observation region where the human being is detected.

6. The adaptive sensing system according to claim 5,
wherein the selective control further includes controlling the active sensor so as to transmit and receive electromagnetic radiation to and from at least a second portion of the observation region where the object is detected, responsive to the detection circuitry detecting the presence of the object in the observation region,
wherein the passive contraband detection circuitry is configured to
generate a first detection result indicating that the presence of a specific object is precluded,
generate a second detection result indicating that the presence of a specific object is detected, and
generate a third detection result indicating that the presence of a specific object can neither be precluded nor detected, and
wherein the control circuitry is configured to control the active sensor so as to emit and receive electromagnetic radiation to and from at least a third portion of the observation region for which the presence of the specific object can neither be precluded nor detected, responsive to the passive contraband detection circuitry generating the third detection result.

7. The adaptive sensing system according to claim 6, wherein the emission of electromagnetic radiation performed when the third detection result is generated is substantially restricted to the third portion of the observation region where the presence of the specific object can neither be precluded nor detected.

8. The adaptive sensing system according to claim 5,
wherein the selective control further includes controlling the active sensor so as to transmit and receive electromagnetic radiation to and from at least a second portion of the observation region where the object is detected, responsive to the detection circuitry detecting the presence of the object in the observation region,
wherein the passive contraband detection circuitry is configured to
determine one of the first portion and the second portion of the observation region where the human being or the object other than a human being is detected, respectively, and
determine a third portion of the observation region for which the presence of the specific object can neither be precluded nor detected,
wherein the passive sensor is configured to be steered to different portions of the observation region so as to receive electromagnetic radiation from a corresponding portion of the observation region towards which the passive sensor is steered, and
wherein the active sensor is configured to be steered to different portions of the observation region so as to transmit and receive electromagnetic radiation to and from a corresponding portion of the observation region on towards which the active sensor is steered.

9. The adaptive sensing system according to claim 1, wherein the passive sensor is configured to operate in the millimeter wave range of electromagnetic radiation.

10. A method of sensing comprising:
detecting presence of human beings and objects other than human beings in a region of observation, and
selectively activating, using circuitry, at least one of an active sensor and a passive sensor responsive to said detecting,
wherein said selective activation using the circuitry includes:
causing the passive sensor to receive electromagnetic radiation from at least a first portion of the observation region where a human being is located when the human being is detected in the observation region,
controlling the active sensor to transmit and receive electromagnetic radiation to and from the first portion of the observation region, and
stopping, interrupting, or reducing, using the circuitry, an amount of one of power and field strength of the electromagnetic radiation emitted from the active sensor to the first portion of the observation region when said detecting detects the presence of the human being in the observation region.

11. The method of sensing according to claim 10, further comprising generating image information relating to the observation region using an optical or infrared camera,
wherein said detecting the presence of human beings and objects other than human beings is based on said generating image information.

12. The method of sensing according to claim 10, further comprising detecting specific objects based on sensor information generated by the passive sensor based on the electromagnetic radiation received from at least the first portion of the observation region where the human being is located.

13. The method of sensing according to claim 12,
wherein said selective activation using the circuitry further includes controlling the active sensor so as to transmit and receive electromagnetic radiation to and from at least a second portion of the observation region where the object is detected, responsive to the detection circuitry detecting the presence of the object in the observation region, and
wherein, when the presence of a specific object can neither be precluded nor detected, the method comprises causing the active sensor to emit and receive electromagnetic radiation to and from at least a third portion of the observation region for which the presence of the specific object can neither be precluded nor detected.

14. The method of sensing according to claim 12,
wherein said selective activation using the circuitry further includes controlling the active sensor so as to transmit and receive electromagnetic radiation to and from at least a second portion of the observation region where the object is detected, responsive to the detection circuitry detecting the presence of the object in the observation region,
wherein said detecting the presence of human beings and objects other than human beings includes determining one of the first portion and the second portion of the observation region where the human being or the object other than a human being is located,
wherein said causing the passive sensor to receive electromagnetic radiation from at least the first portion of the observation region where the human being is located includes steering the passive sensor to the first portion of the observation region where the human being is located so as to receive electromagnetic radiation from the first portion of the observation region, wherein said causing the active sensor to transmit and receive electromagnetic radiation to and from at least the second portion of the observation region where the object is located includes steering the active sensor to the second portion of the observation region where the object other than human being is located so as to transmit and receive electromagnetic radiation to and from the second portion of the observation region, respectively, wherein said detecting specific objects includes determining a third portion of the observation region for which the presence of a specific object can neither be precluded nor detected, and wherein said causing the active sensor to emit and receive electromagnetic radiation to and from at least the third portion of the observation region for which the presence of the specific object can neither be precluded nor detected includes steering the active sensor to the third portion of the observation region for which the presence of the specific object can neither be precluded nor detected so as to emit and receive electromagnetic radiation to and from the third portion of the observation region.

15. A non-transitory computer-readable storage medium storing computer-readable instructions that, when executed by a computer, cause the computer to perform a method comprising:

detecting presence of human beings and objects other than human beings in a region of observation, and selectively activating at least one of an active sensor and a passive sensor responsive to said detecting, wherein said selective activation includes:

causing the passive sensor to receive electromagnetic radiation from at least a first portion of the observation region where a human being is located when the human being is detected in the observation region, controlling the active sensor to transmit and receive electromagnetic radiation to and from the first portion of the observation region, and stopping, interrupting, or reducing an amount of one of power and field strength of the electromagnetic radiation emitted from the active sensor to the first portion of the observation region when said detecting detects the presence of the human being in the observation region.

16. The adaptive sensing system according to claim 1, wherein the control circuitry is configured to selectively control the active sensor and the passive sensor such that the detected human being or the object other than a human being is scanned only once.

17. The adaptive sensing system according to claim 1, wherein the selective control further includes controlling the active sensor so as to transmit and receive electromagnetic radiation to and from at least a second portion of the observation region where the object is detected, responsive to the detection circuitry detecting the presence of the object in the observation region, and wherein the first portion of the observation region and the second portion of the observation region do not overlap.

18. The adaptive sensing system according to claim 1, wherein the selective control further includes controlling the active sensor so as to transmit and receive electromagnetic radiation to and from at least a second portion of the observation region where the object is detected, responsive to the detection circuitry detecting the presence of the object in the observation region, and wherein the control circuitry is configured to stop, interrupt, or reduce the amount of one of power and field strength of the electromagnetic radiation transmitted from the active sensor responsive to a prediction calculation that the human being detected in the observation region is about to enter the second portion of the observation region where the object is detected.

19. The method of sensing according to claim 10, wherein said selective activation using the circuitry further includes controlling the active sensor so as to transmit and receive electromagnetic radiation to and from at least a second portion of the observation region where the object is detected, responsive to the detection circuitry detecting the presence of the object in the observation region, and wherein the first portion of the observation region and the second portion of the observation region do not overlap.

20. The method of sensing according to claim 10, wherein said selective activation using the circuitry further includes controlling the active sensor so as to transmit and receive electromagnetic radiation to and from at least a second portion of the observation region where the object is detected, responsive to the detection circuitry detecting the presence of the object in the observation region, and wherein the method further comprises:

predicting that the human being detected in the observation region will enter the second portion of the observation region where the object is located, and stopping, interrupting, or reducing the amount of one of power and field strength of the electromagnetic radiation output by the active sensor responsive to said predicting.

21. The adaptive sensing system according to claim 1, wherein the selective control further includes controlling the active sensor so as to transmit and receive electromagnetic radiation to and from at least a second portion of the observation region where the object is detected, responsive to the detection circuitry detecting the presence of the object in the observation region.

22. The method of sensing according to claim 10, wherein said selective activation using the circuitry further includes controlling the active sensor so as to transmit and receive electromagnetic radiation to and from at least a second portion of the observation region where the object is detected, responsive to the detection circuitry detecting the presence of the object in the observation region.

23. The non-transitory computer-readable storage medium according to claim 15, wherein said selective activation further includes controlling the active sensor so as to transmit and receive electromagnetic radiation to and from at least a second portion of the observation region where the object is detected, responsive to the detection circuitry detecting the presence of the object in the observation region.

* * * * *